Figure 3:
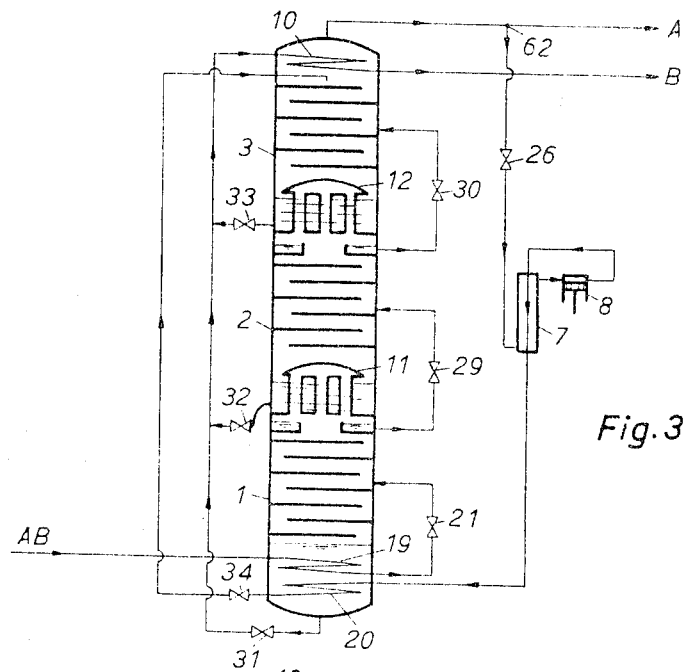

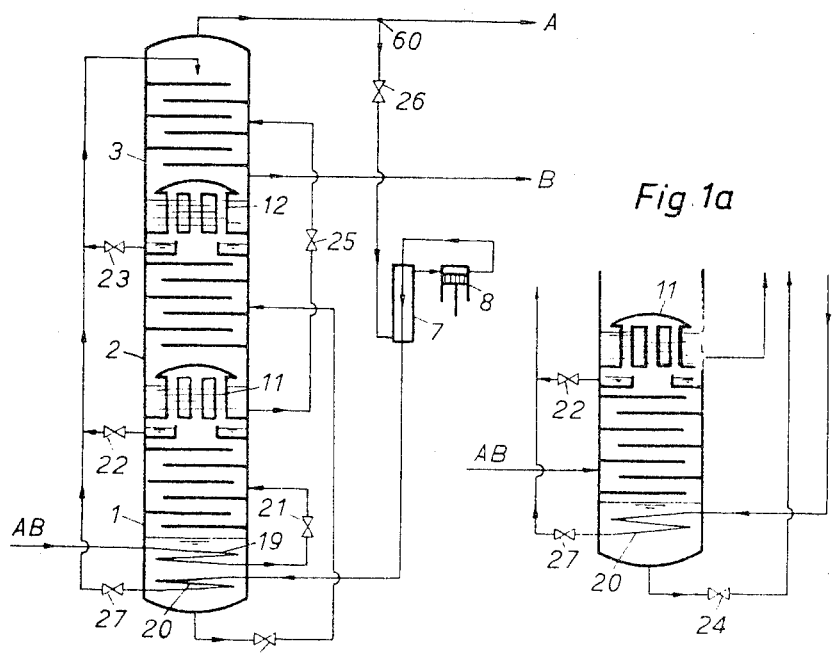
Fig. 1a
Fig. 1
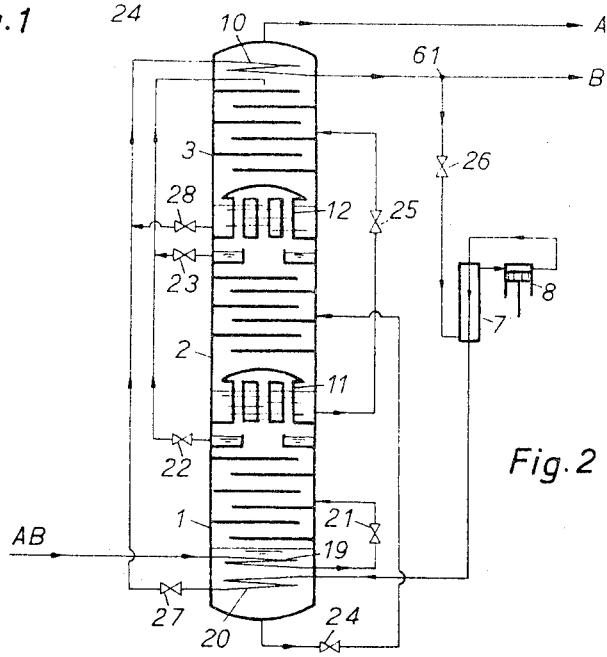
Fig. 2

Aug. 30, 1966   R. BECKER   3,269,131
RECTIFICATION OF LIQUID MIXTURES BOILING AT LOW TEMPERATURES
Original Filed Sept. 16, 1951   3 Sheets-Sheet 2

United States Patent Office 3,269,131
Patented August 30, 1966

3,269,131
RECTIFICATION OF LIQUID MIXTURES BOILING AT LOW TEMPERATURES
Rudolf Becker, Munich-Solln, Germany, assignor to Gesellschaft für Linde's Eismaschinen Aktiengesellschaft, Hollriegelskreuth, near Munich, Germany, a company of Germany
Application Dec. 29, 1961, Ser. No. 163,119, now Patent No. 3,208,231, dated Sept. 28, 1965, which is a division of application Ser. No. 684,359, Sept. 16, 1957, now Patent No. 3,057,168, dated Oct. 9, 1962. Divided and this application Mar. 18, 1965, Ser. No. 440,883
Claims priority, application Germany, Oct. 18, 1956, G 20,749
5 Claims. (Cl. 62—30)

This application is a division of my patent application Serial Number 163,119, filed December 29, 1961, now Patent Number 3,208,231, which is a division of my patent application Serial Number 684,359, filed September 16, 1957, now Patent Number 3,057,168.

The invention relates to a process and devices for the rectification of liquid mixtures boiling at low temperatures. Such liquid mixtures are formed when gas mixtures are compressed, cooled, and condensed in order to be decomposed into their components. The gas mixtures can be cooled to condensation temperature in various ways. The necessary procedural steps are not explained here but are assumed to be known.

It has long been known how to separate low-boiling liquid mixtures, e.g., liquid air, by rectification. When liquid air is rectified in a column, pure oxygen, and nitrogen containing about 7% oxygen can be produced, as can be inferred from the shape of the boiling and thawing point curves of the boiling point diagram of air. If air is to be decomposed into pure oxygen and pure nitrogen, the column head must be cooled to a temperature below the boiling temperature of liquid air, so that pure liquid nitrogen can condense there as reflux. Or liquid nitrogen may be produced in a separate refrigeration cycle and be supplied to the head of the column.

However, in the rectification of liquid air there is nearly always used a double column consisting of two superposed columns connected in series. In the lower column, air is predecomposed into liquid high in oxygen and pure nitrogen at about 5 atm., whereupon the liquid high in oxygen is decomposed in the upper column at slight excess pressure, namely about 1.2 atm., into pure oxygen and pure nitrogen; the pure nitrogen produced in the lower column serving as reflux in the upper column. The pressure ratio of about 4.5 is precisely such that nitrogen in the head of the lower column condenses at the same temperature at which the liquid oxygen evaporates in the foot of the upper column. Strictly speaking, the condensation temperature is somewhat above the evaporation temperature because of the thermal resistance of the condenser-evaporator, but this difference will here be disregarded. Between the two columns, that is, simultaneously in the head of the lower and in the foot of the upper column, there is a condenser-evaporator, on whose condenser side nitrogen condenses and on whose evaporator side oxygen evaporates. The heat of condensation of the nitrogen is thus transferred from the head of the lower column under higher pressure into the foot of the upper column under lower pressure for the evaporation of the oxygen boiling there.

It is also known how to rectify liquid air in three columns. The first column under 5.5 atm. and the last column under 1.5 atm. form together a double column with a condenser-evaporator between them. The liquid high in oxygen obtained in the first column, however is not—as in the double column described above—supplied directly to the last, but to the second column under 2.6 atm., in order there to be predecomposed into liquid of still higher oxygen concentration and pure nitrogen. The liquid nitrogen obtained in the heads of the first and second columns is charged jointly onto the head of the last column as reflux, where pure oxygen and pure nitrogen is produced. The liquid high in oxygen collecting in the foot of the second column is partly evaporated in an evaporator-condenser which is located within the first column between head and foot, while the remainder of this liquid is expanded to the pressure of the last column, completely evaporated in the head of the second column, and then supplied to the third column between head and foot according to its composition. This known three-column arrangement actually constitutes a double column which consists of two columns connected in series and with a third column connected in parallel. The evaporator-condenser disposed between head and foot of the first column has an unfavorable effect on the rectification in that column since it noticeably disturbs the equilibrium adjustment between liquid and vapor phase.

Now there are low-boiling liquid mixture which cannot be decomposed into sufficiently pure components by means of the methods described. These are mixtures where the boiling and thawing point curves are very close together in equilibrium diagram, that is, for whose separation very high columns would be required. Ideal mixtures are always very difficult to separate when the boiling points of the components are close together. But there are also difficultly separable non-ideal mixtures with widely separated boiling points where the boiling and thawing point curves are close together. Complete separation is particularly difficult when a component is to be obtained which is contained in the mixture in very low concentration.

The closer the boiling points of the mixtures to be separated are to the absolute zero point, the more must the spatial extent of the coulmn be reduced in order to keep the heat influx from the surrounding at a low value. The height of a column increases with the number of bottom plates. In a very high column it is very difficult to maintain the temperature gradient required for the rectification precisely at very low temperatures since the heat from the surrounding flows in the more irregularly and the more intensely the farther the surface shape of the insulation deviates from the ideal spherical form. In particular, for difficultly separable mixtures the amount of reflux must be great. Heat must then be removed from the column head by means of a special heat pump cycle. The amount of refrigerant to be pumped in this cycle must be large. High losses of cold are inevitable.

For the rectification according to the invention only relatively short columns with few bottoms are required. This rectification of a liquid mixture boiling at low temperature in at least three columns, where the mixture of the first column under the highest pressure is supplied according to its composition between head and foot and is predecomposed therein, whereupon decomposition products are conveyed to the next column under lower pressure and subsequently to an additional column under still lower pressure, is characterized in that at $a \geqslant 3$ columns and with $a > n > 0$ the heat which is released upon condensation of the gas flowing into the head of the $n$th column is transferred into the foot of the $(n+1)$th column for evaporation of the sump liquid boiling there. In the above, $n$ represents any column except the serially last column and $n+1$ represents the serially next succeeding column thereto. Thus a relatively large number of columns are connected in series, and the pressure difference between two successive columns is so selected that the decomposition product flowing as gas into the head of the preceding $n$th column condenses at the same temperature at which the liquid to be evaporated contained in the foot of the following $(n+1)$th column boils. The method of connecting in series several column in the manner defined has the great advantage that the amounts of substance to be converted decrease from column to column since from each column a portion of a pure decomposition product—either of the more readily or of the more difficultly boiling—can be conducted away. Thus it is not necessary—as in the case of a single column with very many bottoms to convert the entire substance mixture at once. Thus the column volumes can be reduced from column to column. And smaller columns cause smaller cold losses.

It is a disadvantage that the liquid to be decomposed must be treated under a much higher pressure. However, this disadvantage is only apparent; for often the gas mixtures to be decomposed must be compressed to a higher pressure anyway in order to be able to supply the cold required for cooling. Also, considered purely in terms of energy, the work of compression is the less determining the closer the boiling points are to the absolute zero point.

The number of columns is limited by the fact that in each preceding column an exactly defined higher pressure must prevail than in the following. In the limit case, however, the critical pressure may be selected as maximum pressure. Also it must be noted that for ideal mixtures—that is, in most cases in question for gas decomposition—the concentration differences between liquid and vapor phase at constant temperature decrease with increasing pressure. Generally, therefore, a greater reflux is required at higher pressure than at lower pressure. The last stage or stages may, of course, be carried out under reduced pressure, that is, under vacuum, so as to be able to utilize fully the advantages of the rectification according to the invention.

Since in all instances heat is transferred only from the $n$th to the $(n+1)$th column, where $n$ denotes a number between whole number from $a-1$ to 1, both inclusive, the foot of the first column must be heated and the head of the last ($a$th) column must be cooled. This may be achieved in known manner with a heat pump cycle. Or the gas mixture cooled to condensation temperature may in known manner be liquefied in the foot of the first column, whereby heat is supplied there. Enough reflux liquid is available for cooling the head of the last column when sufficient amounts of liquefied head product can be tapped from a sufficient number of columns. If the number of columns is large enough, a heat pump cycle may be dispensed with. This advantage is extremely important, because every heat pump cycle causes considerable losses of cold.

As has been explained in the example of the double column, similarly also in the rectification according to the invention the gas flowing into the head of the $n$th column can be condensed there, whereupon a portion of the resulting condensate is returned into this column as reflux. Now if the columns are so operated that the lower boiling component A collects as pure primary product in the head of the $n$th column, the other portion of the condensate is expanded to the pressure of the $a$th (last) column and charged on the head thereof as reflux. It serves there at the same time for cooling. On the other hand, if the columns are so operated that the higher boiling component B collects as pure primary product in the foot of the $n$th column, the other portion of the condensate is expanded to the pressure of the $(n+1)$th column and is supplied to it between head and foot according to its composition, in order to be further decomposed there.

To be able to heat the foot of the first column and to cool the head of the last column, the procedure is, similarly as is already known for the double column, to condense a refrigerant in the foot of the first column, then expanding it and evaporating it in the head of the last column, whereupon in counter-current with itself it is warmed, compressed, subsequently cooled, and returned to the foot of the first column. The refrigerant may flow in a closed cycle; it must be selected suitably as to its thermal properties. As an alternative, the (lower boiling) decomposition product collecting in the head of the last column may be used as refrigerant. Finally it may be advantageous to use as refrigerant the (higher boiling) decomposition product collecting in the foot of the first column. The choice of refrigerant depends not only on its thermal properties, but also for example on whether it can be compressed without trouble in dry-running compressors, for it should not be contaminated by lubricants or moisture.

In a further development of the inventive idea the gas flowing into the head of the $n$th column is tapped, condensed at least in part in the foot of the $(n+1)$th column, subsequently expanded to the pressure of the $(n+1)$th column and charged on the head thereof as reflux, while a portion of the gas flowing into the head of the last column is tapped, warmed in counter-current with itself, compressed, cooled again, finally condensed in the foot of the first column, then expanded and charged onto the head of this column. This procedure is advantageous when the individual columns are arranged not in superposition but side by side and a liquid pump is to be avoided and when the lower boiling component A is obtained as pure primary product. For then no reflux can be obtained for this column in the head of the $n$th column. The gas flowing into the head of the $n$th column can be condensed only in the foot of the $(n+1)$th column and be used in this column as reflux. For the first column reflux is obtained from gas which flows into the head of the last column and which has been condensed after compression in the foot of the first column.

If the higher boiling component B is the pure primary product, the liquid collecting in the foot of the $n$th column is tapped, expanded to the pressure of the $(n+1)$th column, evaporated in the head of the $n$th column, and subsequently supplied to the foot of the $(n+1)$th column, while a portion of the liquid evaporated in the head of the last column is warmed in counter-current with itself, compressed, again cooled, and finally supplied to the foot of the first column. The gaseous primary product still containing B, that is, one consisting mainly of A, which flows into the head of the $n$th column, is expanded to the pressure of the $(n+1)$th column and supplied to it at a point corresponding to its composition, in order to be decomposed further. Heat is supplied to the foot of the first column by the compressed portion of the higher-boiling decomposition product B returned from the last column.

The rectification according to the invention is suitable in particular for liquid mixtures boiling close to the absolute zero point which contain a component to be recovered in very low concentration. Especially advantageous is the separation of mixture of hydrogen, deuterium hydride, and deuterium, in particular the two first named. The new rectification process is, of course, suitable also for the decomposition of other, possibly multi-component liquid mixtures. An example is the mixture ethane-ethylene-acetylene, to mention only one.

A device for the rectification, where the gas flowing into the head of the $n$th column is also condensed there, whereupon a portion of the resulting condensate is returned into these columns as reflux, is characterized in that at least three columns are arranged in superposition, and between the $n$th and the $(n+1)$th column a condenser-evaporator is located which belongs at the same time to the head of the $n$th and the foot of the $(n+1)$th column. If a closed refrigerant cycle is used with this arrangement, there must be in the foot of the first column a refrigerant condenser and in the head of the first column a refrigerant evaporator. On the other hand, if the lower-boiling decomposition product A collecting in the head of the last column is used as refrigerant, then a refrigerant condenser is required only in the foot of the first column. Accordingly, when the higher-boiling decomposition product is used as refrigerant, a refrigerant evaporator must be present only in the head of the last column.

A device for the rectification according to which the lower-boiling gas A flowing into the head of the $n$th column is tapped as pure primary product and condensed in the foot of the $(n+1)$th column consists in its characteristic parts of at least three columns disposed side by side, a line for gaseous decomposition product leading from the head of the $n$th column to a condenser in the foot of the $(n+1)$th column, while from the lead of the last column a line leads to a compressor and thence to a condenser in the foot of the first column.

Accordingly, for the procedure according to which higher boiling liquid B collecting in the foot of the $n$th column is tapped as pure primary product, evaporated in the head of this column and is subsequently conveyed to the foot of the $(n+1)$th column, $a$, at least three columns disposed side by side are required, a line for liquid decomposition product leading from the foot of the $n$th column to an evaporator in the head of this column and thence to the foot of the $(n+1)$th column, while from the evaporator in the head of the last column a line leads to a compressor and thence to the foot of the first column.

Figure 4:
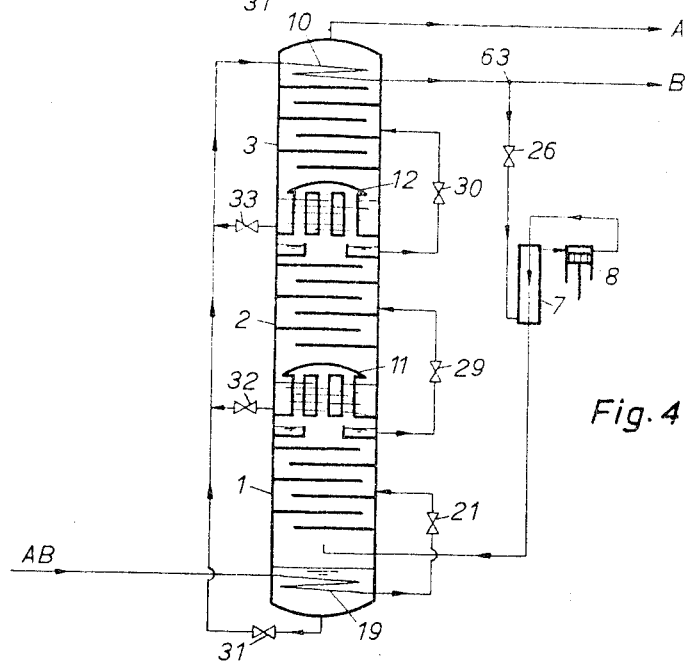
Figure 5:
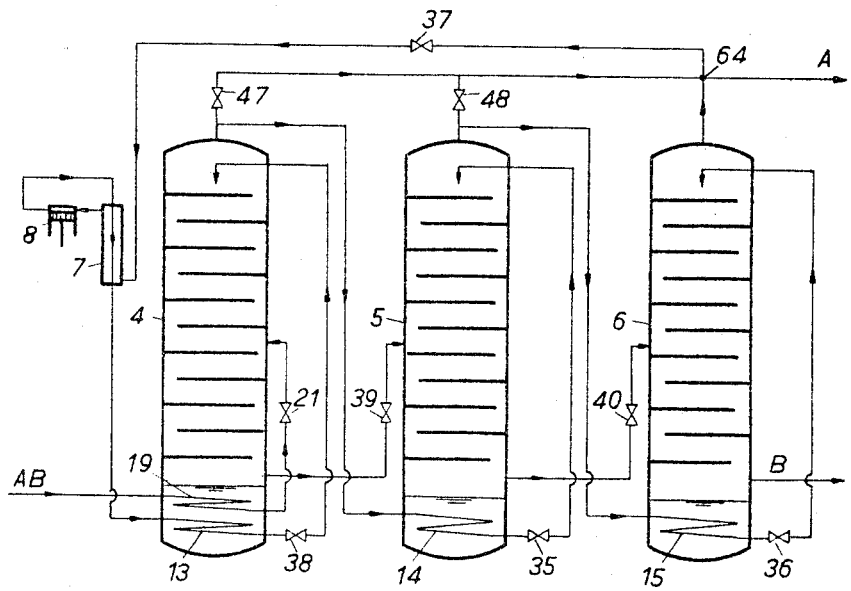
Figure 6:
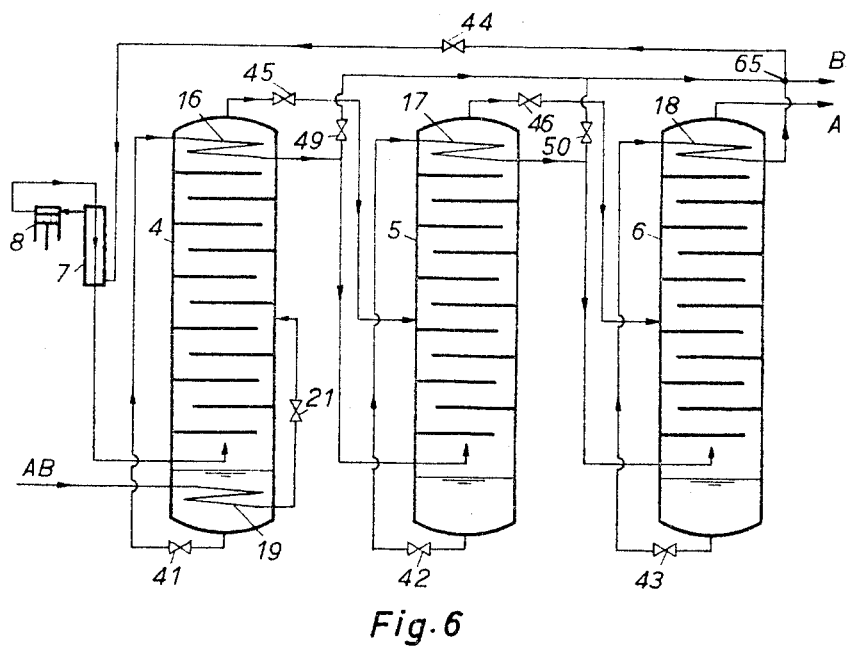

The rectification according to the invention will be explained with reference to the diagrammatic figures of the accompanying drawings. In each instance only three columns of equal size are represented ($a$ equals 3), in order that the figures will be clear. It is obvious that the contents of these columns must be selected in accordance with the operating pressures and the properties of the particular mixtures to be separated. In all figures similar parts are marked with the same symbols. In FIGURES 1 to 4 superposed columns are represented while FIGURES 5 and 6 show columns standing side by side. Only mixture AB of two components A and B will be discussed. Naturally also a multi-component mixture can be separated by the process according to the invention. As products there can then be obtained for examples mixtures of two components. Also, from one of the columns, a mixture may be branched off in known manner and be decomposed into its components in additional columns, not shown.

The columns according to FIGURES 1, 2 and 5, are so operated that the lower boiling component A flows as pure primary product into the heads of the columns, while the higher boiling component B collects as impure primary product, that is, still containing A, in the feet of the columns. In FIGURES 1 and 5, component A serves as refrigerant for the heat pump cycle, in FIGURE 2, component B. The columns according to FIGURES 3, 4 and 6 are so operated that B collects as pure primary product in the column feet, while A contaminated with B flows as impure primary product into the column heads. In FIG. 3, component A serves as refrigerant for the heat pump cycle, in FIGURES 4 and 6, component B.

In the procedure according to FIGURES 1 to 4, the heat pump cycle may be omitted if the number of columns is made large enough. In the processes according to FIGURES 5 and 6, however, a heat pump cycle is required.

Columns 1 to 6 may be equipped for example with sieve or bell bottoms or also with filling material. In columns 1 and 4, respectively, the highest pressure prevails; in columns 2 and 5, a medium pressure; and in columns 3 and 6, the lowest. The pressure differences existing between two columns are so adjusted, that is, the columns are so operated that the heat-transmitting primary product reaching the head of the preceding column, e.g. 1 or 4, condenses there at almost the same temperature as the primary product collecting in the foot of the following column, e.g. 2 or 5. The heat of condensation of the respective head primary product is transmitted to the foot primary products in FIGURES 1 to 4 by means of the condenser-evaporator 11 and 12, and in FIGURES 5 and 6 by means of the condenser 13, 14 and 15, and the evaporators 16, 17 and 18. The counter-current heat exchanger 7, and the compressor 8 form parts of a heat pump cycle, in which a pure decomposition product, either A or B, serves as refrigerant. A heat pump cycle with an extraneous refrigerant, i.e. one not contained in the mixture, is not represented. In the counter-current heat exchanger 7, the refrigerant is heated in counter-current with itself, compressed in compressor 8, cooled again in 7, in order to be subsequently liquefied. At AB the gas mixture cooled to close to the condensation temperature enters column 1, or 4, in which highest pressure prevails, while the pure decomposition products leave the last column 3, or 6, in which lowest pressure prevails, at A and B. The gas mixture AB is supplied at so high a compression that it condenses in the condenser 19, in heat exchange with sump liquid contained in the foot of column 1, or 4, this sump liquid being evaporated at the same time. The liquefied mixture AB is then expanded in valve 21 to the pressure of column 1, or 4, and conveyed to it at a point between head and foot corresponding to its composition. In FIGURE 1$a$ a modification is represented which can be employed in all arrangements shown in FIGURES 1 to 6. The gas mixture AB is there conveyed to column 1 directly, that is, unliquefied.

Let it be assumed that mixture AB consists predominantly of the lower boiling component A. It is then advisable to proceed according to FIGURES 1 and 2. The mixture AB is conveyed to column 1 at a point between head and foot corresponding to its composition in liquid form (FIGURES 1 and 2) after expansion in valve 21 or in gaseous form (FIGURE 1$a$), whereupon it is decomposed into pure gas A and impure liquid B. The pure A is liquefied in the condenser-evaporator 11 and returns in part to column 1 as reflux. The remaining liquid A is tapped from column 1, expanded in valve 22 to the pressure of the (last) column 3, combined with a portion of the pure A liquefied in condenser-evaporator 12, and expanded in valve 23, and charged on the head of column 3 as reflux. The pure decomposition product A flows off through the line marked A. The liquid collecting in the foot of column 1, still containing A but already enriched in B, is expanded in valve 24 to the pressure of column 2, and conveyed to it at a point corresponding to its composition, in order to be there decomposed further into pure gaseous A and liquid still more enriched in B. A portion of the A condensed in condenser-evaporator 12 flows back as reflux into column 2, while the other portion, as has been described, enters the head of column 3. The liquid collecting in the foot of column 2 and strongly enriched in B is evaporated by means of the gaseous A condensing in the head of column 1 in the condenser-evaporator 11. From the foot of column 2 liquid is continuously expanded over vlave 25 to the pressure of column 3, and conveyed to it at a suitable point, in order there to be decomposed into pure A and B. The pure product B leaves column 3, through the line marked B. The amounts of material to be converted in the individual columns decrease from column to column.

In order now to be able to evaporate the liquid in the foot of column 1, a heat pump cycle may be required. According to FIGURE 1 pure A serves as refrigerant, which is tapped at 60 through valve 26, compressed in compressor 8, liquefied in condenser 20, and charged in valve 27 on the head of column 3, together with pure A from columns 1 and 2 as reflux. According to FIGURE 2, pure B serves as refrigerant, which is tapped through valve 28 in liquid form from the foot of column 3. At 61 a portion is branched off as product B through valve 26, and the other portion is compressed in compressor 8. The refrigerant B is then liquefied in condenser 20, the liquid in the foot of column 1 being evaporated at the same time. After expansion in valve 27 it passes into evaporator 10, on whose exterior pure A condenses as reflux for column 3, and thence returns to 61.

If the gas mixture to be decomposed consists predominantly of the higher boiling component B, it is advisable to proceed according to FIGURES 3 and 4. The mixture AB is conveyed to column 1 at a suitable point after expansion in valve 21 in liquid form (FIGURES 3 and 4), whereupon it is decomposed into impure gas A, which still contains B, and pure liquid B. The impure A is liquefied in the condenser-evaporator 11 and in part passes back into column 1, as reflux. The residual liquid impure A is expanded in valve 29 to the pressure of column 2 and conveyed to it at a suitable point. It is decomposed in column 2, into still impure, but more concentrated A, and pure liquid B. The impure A condenses in condenser-evaporator 12; a portion is used as reflux in column 2, the remainder is sent through valve 30 into column 3, in order there to be decomposed into the pure end products A and B. The pure liquid B, which collects in the foot of colunm 1, is expanded in valve 31 to such a low pressure below that prevailing in column 3, that it evaporates in evaporator 10, at a temperature at which pure A in column 3 can condense on the exterior of evaporator 10. The resulting liquid A serves as reflux in column 3, with the pure liquid B coming from the foot of column 1 through valve 31 where are combined the liquid streams consisting of pure B and expanded from columns 2 and 3 in valves 32 and 33, and evaporated in evaporator 10. Since pure liquid B is tapped from each of the three columns, the amounts of substance to be converted decrease from column to column. The head of each column can be cooled to a temperature below the temperature of the foot.

According to FIGURE 3, pure A serves as refrigerant in a heat pump cycle consisting of counterflow device 7, compressor 8, condenser 20, and valve 34. The refrigerant A is branched off at 62 through valve 26 from the decomposition product A. The liquid B present in the foot of column 1, is evaporated by means of the heat of condensation released in condenser 20. The liquid refrigerant expanded in valve 34 is charged directly on the head of the (last) column 3 as reflux.

In FIG. 4, pure B serves as refrigerant in the heat pump cycle. This refrigerant is branched off at 63 through valve 26, and after warming up, compression, and again cooling in 51 and 52 it is conveyed to the foot of column 1, in gaseous form. It there liquefies giving off heat in exchange with the liquid running down in column 1 (reflux) and passes through valve 31 into evaporator 10. On the exterior of evaporator 10 reflux liquid for column 3, condenses.

While with reference to FIGURES 1 to 4, columns have been explained which are arranged in superposition, FIGURES 5 and 6 relate to devices each having three columns 4, 5 and 6 standing side by side. The procedure according to FIGURE 5, will advantageously be selected when a gas mixture AB is to be decomposed which contains predominantly lower-boiling A and only little higher-boiling B. The process according to FIGURE 6 is suitable more for mixtures which are composed predominantly of B and only little A. In both cases the gas mixture AB to be decomposed is liquefied at close to condensation temperature in the heat exchanger 19 in the foot of column 4, and the heat of condensation is transmitted to the sump liquid boiling there. The liquified mixture is then expanded in valve 21 to the pressure of column 4, and conveyed to it at a suitable point.

According to FIGURE 5, a portion of the head product consisting of pure A is passed from column 4 into condenser 14 in the foot of column 5, liquefied there, the sump liquid in column 5 being heated at the same time, then expanded in valve 35 to the pressure prevailing in column 5, and finally charged on the head of this column as reflux. The other portion of the head product of column 5 is expanded in valve 47 to the pressure of column 6 and combined with the head product of column 6 together with a portion of the head product of column 5, which has been expanded in valve 48. The combined flow leaves the columns as pure product A through the line marked A. The portion of the head product from column 5, not tapped through valve 48 flows into the condenser 15, in the foot of column 6 and is there liquefied, expanded in valve 36 to the pressure of this column, and finally charged on its head as reflux. A portion of this decomposition product A is branched off at 64, and aspirated by compressor 8 through valve 37 and counterflow 7, compressed, and liquefied in condenser 13, whereby the sump liquid in the foot of column 4, is evaporated. The resulting liquid A, is then charged as reflux through valve 38 onto the head of column 4. The primary product collecting in the foot of column 4, enriched in B, is expanded in gaseous form in valve 39 to the pressure of column 5 and further decomposed into pure gaseous A and liquid more enriched in B which collects in the foot of column 5. The latter primary product is sent in gaseous form through valve 40 into column 6, in order there to be decomposed into the pure decomposition products A and B.

According to FIGURE 6, the pure decomposition product B collecting in liquid form in the foot of column 4 is expanded in valve 41 to the pressure of column 5 and evaporated in the evaporator 16 in the head of column 4, a reflux of impure A for column 4 being formed. A portion of the evaporated B is expanded in valve 49 to the end pressure with which the pure product B leaves the last column and is combined with the portion of B expanded in valve 50 from evaporator 17 in the head of column 5 with the B flowing from evaporator 18 in column 6 as end product B. The other portion of the B evaporated in evaporator 16 is conveyed in gaseous form to the foot of column 5. This gaseous B rising in column 5 is condensed with liberation of heat and passes back in liquefied form into the foot of column 5, whence it flows through valve 42 into evaporator 17, in order to evaporate there. At the same time reflux for column 5 is formed. The gaseous B flowing from evaporator 17, then enters in part in the foot of column 6, where it is liquefied as it rises, in order subsequently to be recoverable as gaseous decomposition product B after expansion in valve 43 and evaporation in evaporator 18, in the head of column 6. A portion of this decomposition product B is branched off at 65 and aspirated by compresser 8 through valve 44 and counterflow 7, compressed, and sent in gaseous form into the foot of column 4, whereby heat is supplied to the lower part of this column 4. The gases rising into the head of column 4, containing mainly A, are tapped in gaseous form if they are not condensed in heat exchange with liquid B which evaporates in evaporator 16, expanded in valve 45, to the pressure of column 5, and conveyed to this column 5, at a suitable point between head and foot. In column 5, there is formed a head product consisting mainly of A, which contains still less B than the head product of column 4. The head product from column 5 is partly liquefied on evaporator 17, as reflux for this column. The gaseous remainder passes through expansion valve 46 at a suitable point in column 6, in order there to be decomposed into pure A and B. The reflux for column 6 is formed on evaporator 18, in heat exchange with B evaporating there.

The process according to the invention will be explained for the procedure according to FIGURE 1 by an example. Hydrogen contains 0.03% by volume of deuterium hydride. 90% of this deuterium hydride is to be separated and a mixture containing 5% HD is to be obtained, from which deuterium hydride of desired purity can then be produced in a further rectification column known in itself.

Since hydrogen boils at 20.15° K. and deuterium hydride (HD) at 22.15° K. under a pressure of 1 atm. abs., the boiling and thawing point curves are very close together in the boiling point diagram. Since moreover, the initial concentration of the HD is very low, large amounts of reflux are required. If HD were to be separated in a single column, the amount to be supplied in a heat pump cycle would have to be 2.5 to 2.7 times as large as the amount of hydrogen to be processed. When rectifying in 3 columns as per FIGURE 1, a total cycling amount approximately the same as the amount of hydrogen to be decomposed will be sufficient. As operating pressures in the columns 1, 2, 3 there are applied 3, 2, 1 atm. abs.

5000 cu. m. per hour (0° C. 760 mm. Hg), that is, 5000 cu. m./h. hydrogen are supplied at AB with about 30° K. under 5 atm. abs. to the condenser 19, liquefied therein at 27.5° K., and subsequently expanded in valve 21 to the pressure of 3 atm. abs. prevailing in column 1. There a mean temperature of approximately 25° K. prevails. The liquid boiling in the foot of column 1 becomes enriched to 0.0415% HD, while the gas condensing as reflux in condenser-evaporator 11 contains only 0.003% HD. 3500 cu. m./h. hydrogen containing 0.0415% HD are tapped in a liquid form from the foot of column 1, expanded in valve 24 to the pressure of 2 atm. abs. prevailing in column 2, and there decomposed further. 1500 cu. m./h. hydrogen containing 0.003% HD are discharged in liquid form at the head of column 1 and expanded in valve 22 to the pressure of 1 atm. abs. prevailing in column 3. In column 2, in which prevail 2 atm. abs. and a mean temperature of about 23° K., the already enriched 3500 cu. m./h. are further decomposed into 1800 cu. m./h. liquid foot product containing 0.078% HD and 1700 cu. m./h. liquid head product. The latter is expanded in valve 23 to 1 atm. abs. and combined with the head product of column 1, while the former is expended in valve 25 to 1 atm. abs. in order to be further decomposed in column 3.

In the foot of column 3, in which there prevail 1 atm. abs. and in the mean temperature of about 21° K. the desired product containing 5% HD collects, which is obtained in gaseous form at B; it consists of 27 cu. m./h. of a mixture containing 1.35 cu. m./h. HD. From this mixture containing 5% HD there are then obtained in a rectification column, not shown, 1.42 cu. m./h. of a mixture containing 95% HD, which are to be regarded as crude product. The remainder of the 1800 cu. m./h. tapped from the foot of column 2 and expanded in valve 25 to 1 atm. abs., namely 1800–27, that is approximately 1770 cu. m./h., flows as hydrogen containing 0.003% HD into the head of column 3 and there combines with the head products from column 1 and 2 expanded in valves 22 and 23. These 4970 cu. m./h. hydrogen with 0.003% HD content, increased by the amount of hydrogen expanded in valve 27 and originating from the heat pump cycle, flow out at A with about 21° K. At 60, 5000 cu. m./h. are branched off from this stream, aspirated by compressor 8 through valve 26 and counter-current heat exchange 7, compressed to 5 atm. abs. and liquefied in condenser 20, the liquid present in the foot of column 1 being heated at the same time. After expansion to 1 atm. abs. in valve 27, this liquid is available as reflux for column 3 together with the head products from columns 1 and 2, or a total of 8200 cu. m./h.

The heat flow resistance in the evaporator-condensers 11 and 12 causes a temperature difference of less than 0.1° K. between the liquid condensing in the head of column 1, respectively 2, and the liquid evaporating in the foot of column 2, respectively 3. Since—as has been mentioned—the amount of hydrogen to be conducted in the heat pump cycle is much lower in the three-column arrangement than with the use of a single column, more than 30% of energy can be economized.

I claim:

1. Process for the rectification into two fractions of a low boiling liquid, normally gaseous, mixture, in at least three separate columns in series, the components of the mixture having boiling points very close to each other, which comprises supplying the mixture to a first column, in which the highest pressure is maintained, at a point between the head and the foot thereof depending on the composition of said mixture, separating the mixture therein into a pure liquid product and an impure vapor product, removing the impure vapor product as overhead to the serially next column, which is under lower pressure, at a point between the head and the foot thereof, separating said impure vapor product therein into the same pure liquid product as in the first column and a further impure vapor product, removing said further impure vapor product as overhead to the serially next column, under still lower pressure, at a point between the head and the foot thereof and separating it therein, withdrawing a fraction of the same pure liquid product from each column, vaporizing it at least partially by heat exchange in the head of the same column and feeding part of it into the foot of the next column and feeding said part from the last column into the foot of the first column, collecting the other part of the vaporized pure product and withdrawing it.

2. Process for the rectification into two fractions of a low boiling liquid, normally gaseous, mixture, in at least three separate columns in series, the components of the mixture having boiling points very close to each other, which comprises supplying the mixture to a first column, in which the highest pressure is maintained, at a point between the head and the foot thereof depending on the composition of said mixture, separating the mixture therein into a substantially pure liquid product and an impure vapor product, removing the impure vapor product as overhead to the serially next column, which is under lower pressure, at a point between the head and the foot thereof, separating said impure vapor product therein into the same substantially pure liquid product as in the first column and a further impure vapor product, removing said further impure vapor product as overhead to the serially next column, under still lower pressure, at a point between the head and the foot thereof and separating it therein, withdrawing a fraction of the same substantially pure liquid product from each column, vaporizing it at least partially by heat-exchange in the head of the same column and feeding part of it into the foot of the next column, warming said part from the last column in counter-current with itself, compressing it, cooling it again and feeding it into the foot of the first column, collecting the other part of the vaporized product and withdrawing it.

3. Process for the rectification into two fractions of a low boiling liquid, normally gaseous, mixture, in at least three separate columns in series, the components of the mixture having boiling points very close to each other, which comprises supplying the mixture to a first column, in which the highest pressure is maintained, at a point between the head and the foot thereof depending on the composition of said mixture, separating the mixture therein into a substantially pure liquid product and an impure vapor product, removing the impure vapor product as overhead to the serially next column, which is under lower pressure, at a point between the head and the foot thereof, separating said impure vapor product therein into the same substantially pure liquid product as in the first column and a further impure vapor product, removing said further impure vapor product as overhead to the serially next column, under still lower pressure at a point between the head and the foot thereof and separating it therein, withdrawing a fraction of the same substantially pure liquid product from one end of each column, vaporizing it at least partially by heat-exchange in the head of the same column and feeding part of it except the fraction vaporized in the head of the last column into the foot of the next column, collecting said fraction vaporized in the head of the last column and the other part of the vaporized pure product and withdrawing it.

4. Apparatus for the rectification of liquid mixtures boiling at low temperatures comprising:
   at least three rectifying columns disposed side by side and operating at successively lower pressures;
   a connecting line between each column except the last column and the serially next column to lead impure vaporous rectification product from the overhead to the serially next column;
   a line for a liquid fractionation product leading from the foot of each column other than the last column to an evaporator in the head of the same column and thence to the foot of the next succeeding column;
   a line for a liquid fractionation product leading from the foot of the last column to an evaporator in the head of said last column;
   a line for removing gaseous product from the evaporator of the top of each column, each of said lines for removing gaseous product leading to a gaseous product collecting line,
   a line leading from the gaseous product collecting line to a compressor and thence to the foot of the first column.

5. Apparatus for the rectification of liquid mixtures boiling at low temperatures comprising:
   at least three rectifying columns disposed side by side and operating at successively lower pressures;
   a connecting line between the overhead of each column except the last column and the serially next column to lead impure vaporous rectification product to the serially next column;
   a line for a liquid fractionation product leading from the foot of each column other than the last column to an evaporator in the head of the same column and thence to the foot of the next succeeding column;
   a line for a liquid fractionation product leading from the foot of the last column to an evaporator in the head of said last column;
   a line for removing gaseous product from the evaporator of the top of each column.

References Cited by the Examiner

UNITED STATES PATENTS

| | | | |
|---|---|---|---|
| 1,664,412 | 4/1928 | Haynes | 62—31 X |
| 2,040,116 | 5/1936 | Wilkinson | 62—26 X |
| 2,213,338 | 9/1940 | De Baufre | 62—26 X |
| 2,692,484 | 10/1954 | Etienne | 62—31 X |
| 3,057,168 | 10/1962 | Becker | 62—30 X |

FOREIGN PATENTS 856,683  12/1960  Great Britain.

NORMAN YUDKOFF, *Primary Examiner.*

V. W. PRETKA, J. C. JOHNSON, *Assistant Examiners.*